United States Patent
Desouky et al.

(10) Patent No.: US 12,540,268 B2
(45) Date of Patent: Feb. 3, 2026

(54) METHOD FOR STABILIZING WELLBORE, STABILIZED WELLBORE AND WELLBORE STABILIZING FLUID

(71) Applicants: SAUDI ARABIAN OIL COMPANY, Dhahran (SA); KING FAHD UNIVERSITY OF PETROLEUM & MINERALS, Dhahran (SA)

(72) Inventors: Mahmoud H. Desouky, Dhahran (SA); Murtada Saleh Aljawad, Qatif (SA); Theis Solling, Khobar (SA); Murtadha J. AlTammar, Dhahran (SA); Khalid Mohammed Alruwaili, Dammam (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 18/620,446

(22) Filed: Mar. 28, 2024

(65) Prior Publication Data
US 2024/0240072 A1 Jul. 18, 2024

Related U.S. Application Data

(62) Division of application No. 17/655,273, filed on Mar. 17, 2022, now abandoned.

(51) Int. Cl.
*C09K 8/46* (2006.01)
*C04B 2/02* (2006.01)
(Continued)

(52) U.S. Cl.
CPC .................. *C09K 8/46* (2013.01); *C04B 2/02* (2013.01); *C04B 7/345* (2013.01); *C04B 26/32* (2013.01);
(Continued)

(58) Field of Classification Search
CPC . C09K 8/46; C09K 8/42; C09K 8/467; C09K 8/48; C09K 8/50; C09K 8/504;
(Continued)

(56) References Cited

U.S. PATENT DOCUMENTS

| 2,302,913 A | * | 11/1942 | Reimers | .................. C09K 3/12 |
| | | | | 204/450 |
| 2,492,212 A | * | 12/1949 | Dailey | ..................... C09K 8/46 |
| | | | | 405/266 |

(Continued)

FOREIGN PATENT DOCUMENTS

| WO | WO-2010017571 A1 * | 2/2010 | ........... C04B 28/008 |
| WO | WO-2019086864 A1 * | 5/2019 | ........... C09K 8/5045 |

*Primary Examiner* — Angela M DiTrani Leff
(74) *Attorney, Agent, or Firm* — Osha Bergman Watanabe & Burton LLP

(57) ABSTRACT

A method for stabilizing a wellbore includes introducing a hardening agent into the wellbore, mixing the hardening agent with a carrier fluid in the wellbore to produce a wellbore stabilizing fluid, and treating a wellbore wall of the wellbore by contacting the wellbore stabilizing fluid to a surface of the wellbore wall for at least 48 hours. A wellbore stabilizing fluid includes a hardening agent and a carrier fluid. The hardening agent is selected from one of 10 to 100 g/L of the calcium hydroxide nanocrystals, 5 to 99.9% by volume of tetraethyl orthosilicate (TEOS), and 10 to 50 g/L of zinc sulfate. A stabilized wellbore includes a wellbore having a wellbore wall treated with a wellbore stabilizing fluid comprising a hardening agent. The Young's modulus of the treated wellbore wall is at least 5% higher than a Young's modulus of a non-treated wellbore wall.

10 Claims, 5 Drawing Sheets

(51) Int. Cl.
*C04B 7/345* (2006.01)
*C04B 26/32* (2006.01)
*C09K 8/44* (2006.01)
*E21B 33/138* (2006.01)
*C04B 103/00* (2006.01)

(52) U.S. Cl.
CPC .............. *C09K 8/44* (2013.01); *E21B 33/138* (2013.01); *C04B 2103/0093* (2013.01)

(58) Field of Classification Search
CPC ........ C09K 8/5045; C09K 8/502; C09K 8/44; E21B 33/138; E21B 33/13; C04B 2/02; C04B 7/345; C04B 26/32; C04B 2103/0093
USPC ........................................................ 166/292
See application file for complete search history.

(56) References Cited

U.S. PATENT DOCUMENTS

| | | | |
|---|---|---|---|
| 12,006,260 B2* | 6/2024 | Russell | C04B 38/0605 |
| 2021/0301140 A1* | 9/2021 | Desouky | C09C 1/021 |
| 2023/0133285 A1* | 5/2023 | Russell | C04B 22/068 |
| | | | 106/643 |

* cited by examiner

METHOD FOR STABILIZING WELLBORE, STABILIZED WELLBORE AND WELLBORE STABILIZING FLUID

BACKGROUND

Wellbore stability issue may arise during the drilling operation of an oil and gas wellbore or after an acid treatment of subterranean formation rocks ("formation rocks"), in which an acidic fluid is injected into the subterranean formation ("formation"). In the drilling operation, a drilling fluid, which may contain various components and additives, may react with the formation rocks, reducing the rock strength. Such reduction in the rock strength may lead to a collapse of a wellbore, or induce fractures in the wellbore wall or the formation surrounding the wellbore, resulting in various drilling issues such as drilling fluid loss, a tight hole or a stuck pipe. In the acid treatment, an injected acid flows through the pores of the formation rock and dissolves a portion of the formation rocks, creating enlarged channels or "wormholes." While such dissolution of formation rocks may lead to improved permeability of the rocks, it may also lead to the deterioration of rock mechanical properties, affecting the wellbore stability. Such weakened formation may also result in the generation of loose solid rocks which is undesirable.

Wellbore collapse and formation fractures caused by weakened formations rocks negatively affect the overall efficiency and operational cost of the oil and gas extraction operation. Accordingly, there exists a need for continuing improvement to stabilize an oil and gas wellbore.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for stabilizing a wellbore comprising a treatment cycle of introducing a hardening agent into the wellbore, mixing the hardening agent with a carrier fluid in the wellbore to produce a wellbore stabilizing fluid, and treating a wellbore wall of the wellbore by contacting the wellbore stabilizing fluid to a surface of the wellbore wall and maintaining the contacting for at least 48 hours.

In another aspect, embodiments disclosed herein relate to a wellbore stabilizing fluid, comprising a hardening agent and a carrier fluid. The hardening agent comprised in the wellbore stabilizing fluid may be selected from one of 10 g/L to 100 g/L of the calcium hydroxide nanocrystals, 5% to 99.9% by volume of tetraethyl orthosilicate (TEOS), and 10 g/L to 50 g/L of zinc sulfate.

In another aspect, embodiments disclosed herein relate to a stabilized wellbore, comprising a wellbore having a wellbore wall treated with a wellbore stabilizing fluid including a hardening agent. The Young's modulus of the wellbore wall treated with the wellbore stabilizing fluid may be at least 5% higher than a Young's modulus of a wellbore wall of a wellbore not treated by the wellbore stabilizing fluid.

Other aspects and advantages of the claimed subject matter will be apparent from the following description and the appended claims.

DETAILED DESCRIPTION

Figure 1A:
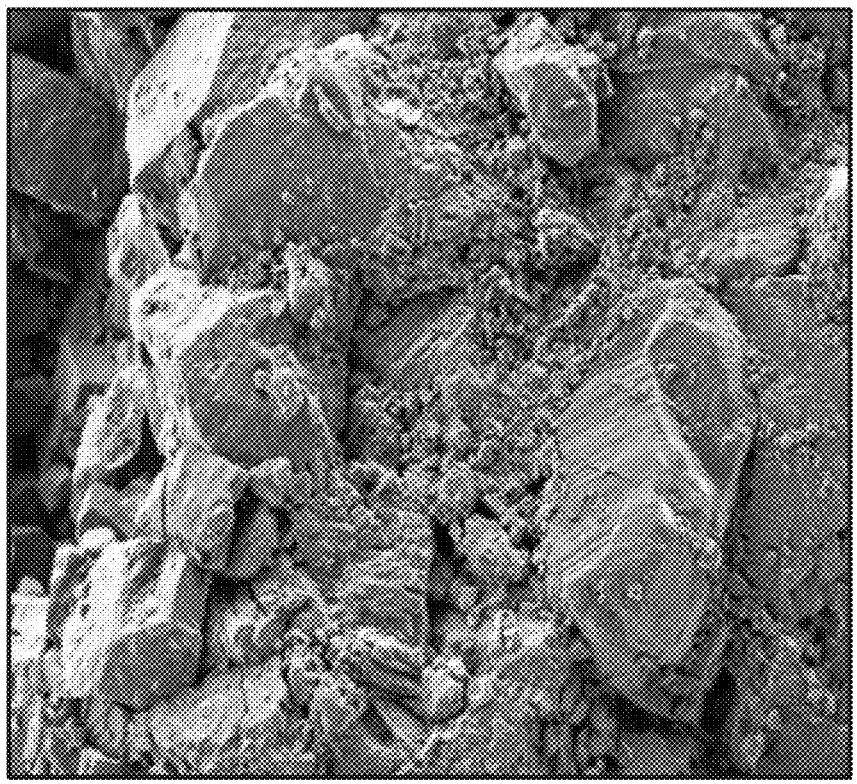
FIG. 1A is a scanning electron microscopic image of the surface of the formation rock sample in EXAMPLE 1 before the surface hardening treatment in accordance with one of more embodiments.

The present disclosure generally relates to a method of stabilizing an oil and gas wellbore with a hardening agent, a stabilized wellbore that is stabilized with the hardening agent, and a wellbore stabilizing fluid comprising the hardening agent.

The wellbore of one or more embodiments may be a hydrocarbon well, such as an oil well, a gas well, a gas condensate well, or a mixture of hydrocarbon-bearing fluids. The wellbore may include a bored hole that extends from the surface into a formation. Wellbore is defined by wellbore wall, and the wellbore may be vertical or may take a deviated or horizontal configuration.

The formation may include different layers of rocks having varying characteristics, such as degrees of density, permeability, porosity, and fluid saturations. The formation may include a low-pressure formation (for example, a gas-depleted former hydrocarbon-bearing formation) and a water-bearing formation (for example, fresh water, brine, former waterflood). When the wellbore is being operated as a production well, the wellbore may facilitate the extraction of hydrocarbons from a hydrocarbon-bearing formation. When the wellbore is being operated as an injection well, the wellbore may facilitate the injection of substances, such as gas, water, or acid, into the formation.

Wellbore Stabilizing Fluid

In one aspect, embodiments herein relate to a wellbore stabilizing fluid comprising a hardening agent and a carrier fluid.

In one or more embodiments, the wellbore stabilizing fluid may comprise a hardening agent. The hardening agent may increase the hardness of formation rocks, such as carbonate rocks. In one or more embodiments, the hardening agent may include calcium hydroxide nanocrystals, tetraethyl orthosilicate (TEOS), and zinc sulfate.

Above-mentioned hardening agents may have different mechanisms to improve the hardness of the formation rocks. Calcium hydroxide nanocrystals may react with carbon dioxide and moisture to form calcium carbonate polymorphs, which may coat the surface of the rock surface and increase the hardness of the rock. A polymorph refers to a chemical compound which may exhibit more than one crystalline from, or lattice structure. TEOS may provide the hardening effect by forming Si—O—Si bonds through hydrolysis-condensation reaction. TEOS may be effective in rocks with substantial quartz fraction. Zinc sulfate, which may dissociate into zinc and sulfate ions in a solution, may undergo an exchange reaction with calcium carbonate of the formation rocks to produce zinc carbonate. Zinc carbonate, which is a harder composition than calcium carbonate, may precipitate onto the surface of the formation rock, resulting the rock hardness to increase.

In one or more embodiments, the wellbore stabilizing fluid may include a hardening agent; and a carrier fluid. In one or more embodiments, the hardening agent comprised in the wellbore stabilizing fluid may be selected from one of calcium hydroxide nanocrystals, TEOS and zinc sulfate.

In one or more embodiments, the wellbore stabilizing fluid may contain calcium hydroxide nanocrystals as a hardening agent in an amount of about 10 g/L to 100 g/L, such as a lower limit selected from any one of 10, 15, 20 and 25 g/L, to an upper limit selected from any one of 30, 40, 50, 60, 70, 80, 90 and 100 g/L, where any lower limit may be paired with any upper limit. In one or more embodiments, the wellbore stabilizing fluid may contain calcium hydroxide nanocrystals as a hardening agent in an amount of 25 g/L.

In one or more embodiments, calcium hydroxide nanocrystals may have a particle size of about 200 nm or less. The particle size refers to the largest dimension of the nanocrystal. In one or more embodiments, carbon hydroxide nanocrystals may have a particle size ranging from a lower limit selected from any one of 1, 5, 10, 20, 30, 40 and 50 nm to an upper limit selected from any one of 100, 125, 150, 175 and 200 nm, where any lower limit may be paired with any upper limit. In one or more embodiments, calcium hydroxide nanocrystals may have the shape of a hexagonal plate.

In one or more embodiments, the wellbore stabilizing fluid may contain TEOS as a hardening agent in an amount of about 5% to 99.9% by volume, such as a lower limit selected from any one of 5, 9.1, 10, 15, 20% by volume, to an upper limit selected from any one of 80, 90, 95, 99, 99.9% by volume, where any lower limit may be paired with any upper limit. In one or more embodiments, the wellbore stabilizing fluid may contain TEOS as a hardening agent in an amount of 9.1% by volume (1 part TEOS, 10 part well stabilizing fluid).

In one or more embodiments, the wellbore stabilizing fluid may contain zinc sulfate as a hardening agent in an amount of about 10 g/L to 50 g/L, such as a lower limit selected from any one of 10, 15 and 16 g/L, to an upper limit selected from any one of 32, 40 and 50 g/L, where any lower limit may be paired with any upper limit. In one or more embodiments, the wellbore stabilizing fluid may contain zinc sulfate as a hardening agent in an amount of 16 g/L or 32 g/L.

In one or more embodiments, the wellbore stabilizing fluid may contain a carrier fluid. The carrier fluid may be any fluid which the hardening agent may be incorporated into. In one or more embodiments, the carrier fluid may include, but is not limited to, a drilling fluid or "drilling mud" conventionally used in the drilling operation of the oil and gas wellbore, an injection fluid, a formation fluid which may be present in the formation, brine, water, and fluids used in acid treatment such as acidic fluid, and a combination thereof. The drilling fluid may be water-based, oil-based or other types of fluid. The drilling fluid may generally contain water, clay and various types of additives. In one or more embodiments, the carrier fluid may also include any fluid which is used to dissolve the hardening agent prior to being introduced into the wellbore, such as water or a solvent, including ethanol and isopropanol.

In one or more embodiments, the carrier fluid may contain additives conventionally used in various oil and gas operations such as wellbore drilling, oil and gas extraction, and acid treatment. Such additives may include, but are not limited to, corrosion inhibitors, friction reducers, non-emulsification agents, anti-sludging agents, pH-adjusting agents, pH-buffers, oxidizing agents, enzymes, lost circulation materials, scale inhibitors, surfactants, clay stabilizers, paraffin inhibitors, asphaltene inhibitors, penetrating agents, clay control additives, reducers, oxygen scavengers, emulsifiers, foamers, gases, derivatives thereof, thickeners, viscosity modifiers, lubricants, shale inhibitors, weighting agents, deflocculants, a hydrogen sulfide, scavenger, iron control agent, mutual solvent, and combinations thereof.

In one or more embodiments, the wellbore stabilizing fluid may optionally contain a solvent which may include, but is not limited to, ethanol and isopropanol.

In one or more embodiments, the wellbore stabilizing fluid may be capable of hardening a wellbore wall of a subterranean wellbore to stabilize the wellbore. Such hardening of a wellbore wall may be characterized by obtaining a Young's modulus of the wellbore wall. A Young's modulus represents the stiffness or hardness of a material, and a harder material generally has a higher Young's modulus. The treatment of wellbore wall with wellbore stabilizing fluid may increase the Young's modulus of the wellbore wall, contributing to the improvement of wellbore stability. Such treatment of the wellbore wall may also be referred to as a "surface hardening treatment" of a wellbore wall.

In one or more embodiments, the wellbore stabilizing fluid may be capable of increasing the Young's modulus of a wellbore wall by at least 5%, 10%, or 15% more than the Young's modulus of a wellbore wall not treated by the wellbore stabilizing fluid, including the wellbore wall prior to the treatment with the wellbore stabilizing fluid. Such increase of Young's modulus may be obtained by treating the wellbore wall of a wellbore by contacting the wellbore stabilizing fluid to the surface of the wellbore wall and maintaining the contact for a predetermined amount of time, such as at least 48 hours, at least 60 hours, at least 70 hours, at least 80 hours, at least 90 hours or at least 100 hours.

Stabilized Wellbore

In one aspect, embodiments herein relate to a stabilized wellbore. As noted previously, interaction of drilling fluids and/or acidizing fluid with formation rocks, including calcite or calcium carbonate rock, may lead to reduced rock strength, wellbore collapse, or formation of fractures in the wellbore wall or the formation surrounding the wellbore, which may lead to various issues, such as mud loss, a tight hole and a stuck pipe. A stabilized wellbore may reduce or eliminate such issues, resulting in overall efficiency improvement of drilling and oil and gas extraction operations.

In one or more embodiments, the stabilized wellbore may include a wellbore having a wellbore wall treated with a wellbore stabilizing fluid comprising a hardening agent. The wellbore stabilizing fluid may include any of the embodiments described in the previous section.

In one or more embodiments, the stabilized wellbore may include a wellbore wall having a Young's modulus at least 5% higher, 10% higher, or 15% higher, than the Young's modulus of a wellbore wall not treated by the wellbore stabilizing fluid, such as the wellbore wall prior to the treatment with the wellbore stabilizing fluid.

In one or more embodiments, the stabilized wellbore may include a wellbore having a wellbore wall treated with at least two wellbore stabilizing fluids. In one or more embodiments, the wellbore wall may be treated with at least two of a first wellbore stabilizing fluid, a second wellbore stabilizing fluid and a third wellbore stabilizing fluid. In one or more embodiments, the first wellbore stabilizing fluid may comprise calcium hydroxide nanocrystals, the second wellbore stabilizing fluid may comprise TEOS, and the third stabilizing fluid may comprise zinc sulfate.

In one or more embodiments, the wellbore wall may be treated with one type of wellbore stabilizing fluid once or may be treated multiples times. For Example, the wellbore wall may be treated with the first wellbore stabilizing agent, followed by the second and third wellbore stabilizing agent, or the wellbore wall may be treated with the first wellbore stabilizing agent, followed by the second and then first wellbore stabilizing agent again. There is no limitation on how many times the wellbore may be treated with the wellbore stabilizing agent, and the sequence of different wellbore stabilizing fluids in which the wellbore wall is treated. The number and sequence of the treatments may be optimized based on various factors such as the wellbore wall properties of a specific combination of the treatments may provide, and economical considerations.

Method for Stabilizing Wellbore

In one aspect, embodiments herein relate to a method for stabilizing a wellbore. The method may comprise a treatment cycle which may include introducing a hardening agent into the wellbore, mixing the hardening agent with a carrier fluid in the wellbore to produce a wellbore stabilizing fluid, and treating a wellbore wall of the wellbore by contacting the wellbore stabilizing fluid to a surface of the wellbore wall and maintaining the contacting for a specific amount of time, such at least 48 hours.

Introduction of Hardening Agent to Wellbore

In one or more embodiments, the method for stabilizing a wellbore may include introducing a hardening agent into the wellbore. The hardening agent may be any of the hardening agent described in the previous section. In one or more embodiments, the hardening agent may be introduced into the wellbore by directly adding to a carrier fluid, such as a drilling fluid, which is being circulated into and out of the wellbore by a fluid circulation system prior to the introduction of the hardening agent. A fluid circulation system may be a conventionally used drilling system which may be comprised of a drilling rig, drill string including a drill pipe, down hole assembly, and a drill bit, a drilling fluid return line, drilling fluid receiving and storage tanks, and a stand pipe.

In one or more embodiments, the hardening agent may be mixed with another substance, which may include any of the aforementioned carrier fluid or other fluid suitable for mixing the hardening agent in, to produce a "pre-mix", and the pre-mix may be added to the carrier fluid in circulation. In one or more embodiments, the hardening agent may be added, directly or a in a form of a pre-mix, to a carrier fluid prior to being circulated into the wellbore, and the carrier fluid, which contains the hardening agent, may be introduced into the wellbore. In one or more embodiments, the hardening agent may be introduced into the wellbore by a combination of any of the introduction method described above. The hardening agent may be introduced into the wellbore intermittently or continuously, depending on the requirement of a specific application.

Mixing of Hardening Agent and Carrier Fluid

In one or more embodiments, the method for stabilizing a wellbore may include mixing the hardening agent with the carrier fluid in the wellbore to produce a wellbore stabilizing fluid. Mixing of the hardening agent and the carrier fluid produces the wellbore stabilizing fluid which may be used to treat the surface of the wellbore wall. In one or more embodiments, the mixing may be performed simultaneously with the introduction step of the hardening agent into the wellbore. For example, the introduction and mixing steps may be conducted simultaneously in case the hardening agent or a pre-mix containing the hardening agent is introduced to the carrier fluid that is in circulation. In one or more embodiments, the mixing step may be performed prior to the introduction of hardening agent into the wellbore. For example, as noted previously, the hardening agent or pre-mix containing a hardening agent may be mixed with a carrier fluid prior to being introduced into the wellbore. There is no limitation on the sequence of the mixing step and the introduction step, provided that the method of stabilizing a wellbore includes both steps.

Treating of Wellbore Wall

In one or more embodiments, the method for stabilizing a wellbore may include treating a wellbore wall of the wellbore by contacting the wellbore stabilizing fluid to a surface of the wellbore wall and maintaining the contacting for a specific amount of time. Maintaining the wellbore stabilizing fluid to be in contact with the wellbore wall for a predetermined amount of time provides the hardening agent sufficient time to react with the formation rocks in order to increase the hardness of the wellbore wall, thereby stabilizing the wellbore. The hardness of the wellbore wall may be characterized by measuring the Young's modulus, as previously noted.

In one or more embodiments, the contacting and maintaining steps may be conducted by continuing to circulate the wellbore stabilizing fluid into and out of the wellbore using a fluid circulation system. In one or more embodiments, the circulation of the wellbore stabilizing fluid may be stopped after the introduction of hardening agent into the wellbore and mixing of the hardening agent with the carrier fluid are completed, such that the treatment is conducted by a wellbore stabilized fluid that is not in circulation.

In one or more embodiments, the method may include maintaining the wellbore stabilizing fluid to be in contact with the wellbore wall for about 48 hour or more, such as at least 48 hours, at least 60 hours, at least 70 hours, at least 72 hours, at least 80 hours, at least 90 hours or at least 100 hours. In one or more embodiments, the method may include maintaining the wellbore stabilizing fluid to be in contact with the wellbore wall for a duration in a range having a lower limit selected from any one of 48, 50, 55 hours to an upper limit selected from any one of 65, 70 and 72 hours, where any lower limit may be combined with any upper limit.

In one or more embodiments, the method may include repeating the treatment cycle of the introducing the hardening agent, the mixing, and the treating. There is no limitation on the number of repeat treatment cycles, and it may be at least once, such as repeating the treatment cycle once, twice, three times, four times or five times.

In one or more embodiments, the hardening agent in the repeated treatment cycle may be the same hardening agent as the hardening agent of a treatment cycle immediately preceding treatment cycle. In one or more embodiments, the hardening agent in the repeated treatment cycle may be chemically different than a hardening agent of a treatment cycle immediately preceding treatment cycle. For example, as previously noted, different wellbore stabilizing fluid, such as a wellbore stabilizing fluid comprising calcium hydroxide nanocrystals, a wellbore stabilizing fluid comprising TEOS, and a wellbore stabilizing fluid comprising zinc sulfate, may separately be used in each treat cycle. There is no limitation on the sequence of the wellbore stabilizing fluid to be used, a number of treatment cycles, or a number of repeated treatment cycle by one specific wellbore stabilizing fluid, and the sequence may be optimized based on the requirements of a specific application.

In one or more embodiments, the method for stabilizing wellbore may be conducted at an ambient temperature, or at an elevated temperature in a range of about 40° C. to 100° C. In one or more embodiments, the elevated temperature may range from a lower limit selected from any one of 40, 45, 50, 55, 60° C. to an upper limit selected from any one of 80, 85, 90, 95 and 100° C., where any lower limit may be combined with any upper limit. In one or more embodiments, the method for stabilizing wellbore may be conducted at an elevated temperature of 80° C.

In one or more embodiments, the entire treatment cycle, including repeated treatment cycle, may be conducted at the above-mentioned elevated temperature range. In one or more embodiments, a portion of the treatment cycle, which includes introduction of hardening agent into wellbore, mixing the hardening agent with a carrier fluid, and treating the wellbore wall with a wellbore stabilizing fluid, may be conducted at the above-mentioned elevated temperature range.

Evaluation—Core Samples of Wellbore Wall

As previously noted, the Young's modulus of a wellbore wall may be measured to characterize the stability of the wellbore, and the treatment of the wellbore wall with a wellbore stabilizing fluid may increase the Young's modulus of a wellbore wall. The Young's modulus of a treated wellbore wall with the wellbore stabilizing fluid and untreated wellbore wall may be determined by testing "core samples" or "plug samples" of the wellbore wall. Core and plug samples are cylindrical samples obtained by cutting a small portion of the wellbore wall. The Young's modulus may be measured by non-destructive techniques. In one or more embodiments, the Young's modulus of the core samples may be obtained by a device to measure the hardness of a material, such as AutoScan scanner manufactured by NER Inc., which uses the impulse hammer method. The Young's modulus of the core samples may also be obtained using acoustics.

In order to further determine the effect of a wellbore stabilizing fluid treatment on the wellbore wall, the core samples may also be subjected to a mechanical test, such as a standard Thick Wall Cylinder (TWC) test. The degree of sample deformation or "borehole breakout" of treated and untreated samples may be compared, and the surface morphology of the treated and untreated samples may be observed with scanning electron microscopy (SEM) and X-ray fluorescence (XRF) and compared.

EXAMPLES

The following examples are provided to illustrate embodiments of the present disclosure. The Examples are not intended to limit the scope of the present invention, and they should not be so interpreted. The treatment applied to samples in the examples below is a simulation of the treatment process of a wellbore wall with wellbore stabilizing fluid and may represent the effect of the surface hardening treatment on the wellbore wall properties of one or more embodiments.

Example 1

A plug sample of Indian limestone formation rock having a diameter of 2.5 inches was prepared. Young's modulus of the plug sample was measured at 25 different locations of the plug sample using AutoScan scanner manufactured by NER Inc. The core sample was also analyzed by SEM and XRF. The core sample was immersed in a wellbore stabilizing fluid which was a colloidal dispersion of calcium hydroxide $(Ca(OH)_2)$ nanocrystal in ethanol. The $Ca(OH)_2$ nanocrystal had a hexagonal plate shape and the particle size was 100 nm. The concentration of $Ca(OH)_2$ nanocrystal in the fluid was 25 g/L. The core sample in the fluid was placed in a humidity chamber set at the temperature of 25° C. and relative humidity of 75% for 48 hours. The core sample was then removed from the fluid and dried at 60° C. for 4 hours. Young's modulus of the treated plug sample was measured, and SEM and XRF analyses were conducted in the same manner as before the treatment.

Example 2

A plug sample was obtained and subjected to the surface hardening treatment in accordance with the method described in EXAMPLE 1, except that the ethanol was replaced with isopropyl alcohol. Young's modulus was measured, and SEM/XRF analyses were conducted before and after the treatment as described in EXAMPLE 1.

Example 3

A plug sample was obtained and subjected to surface hardening treatment in accordance with the method described in EXAMPLE 1, except that the core sample was immersed in a well stabilizing fluid produced by diluting 1 part TEOS by 10 part water by volume. Young's modulus was measured, and SEM/XRF analyses were conducted before and after the treatment as described in EXAMPLE 1.

Example 4

A plug sample was obtained and subjected to surface hardening treatment in accordance with the method described in EXAMPLE 1, except that the core sample was immersed in a well stabilizing fluid produced by dissolving 3.55 gram of zinc sulfate salt in 250 mL of water (0.1 molar concentration). Young's modulus was measured, and SEM/XRF analyses were conducted before and after the treatment as described in EXAMPLE 1.

Young's Modulus Evaluation and SEM Analysis

Figure 1B:
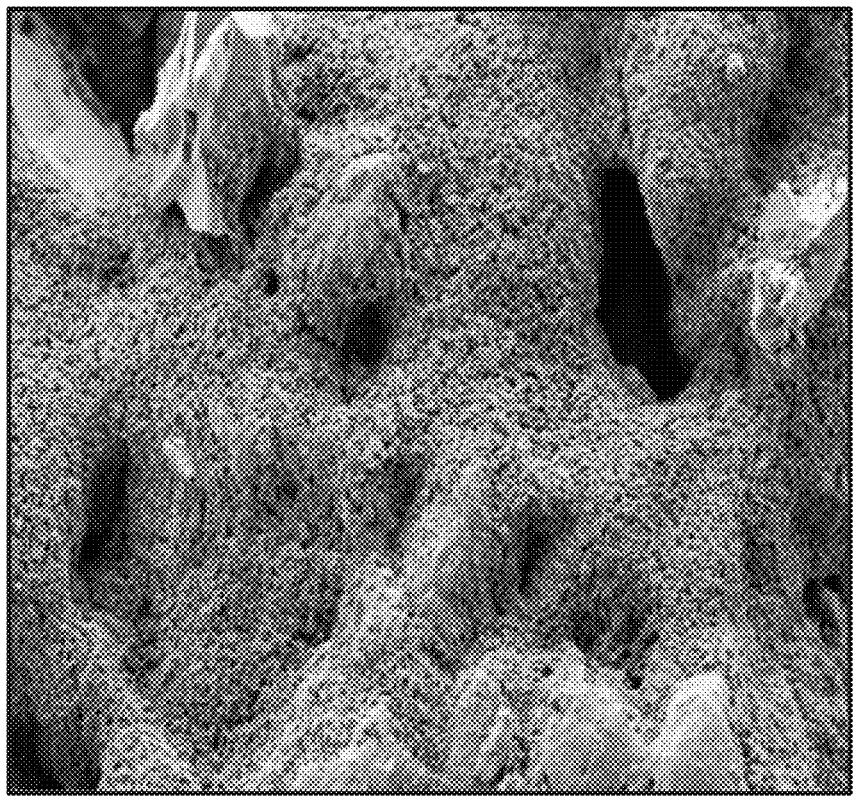
FIG. 1B is a scanning electron microscopic image of the surface of the formation rock sample in EXAMPLE 1 subjected to the surface hardening treatment in accordance with one of more embodiments.

FIGS. 1A and 1B are SEM images of the plug sample of EXAMPLE 1 before and after the treatment with the wellbore stabilizing fluid, respectively. FIG. 1A shows a typical appearance of calcite grains, while FIG. 1B shows that the deposited calcium carbonate polymorph formed by (Ca(OH)$_2$) nanocrystal covers the surface of the sample and bond the calcite grains together.

Figure 2A:
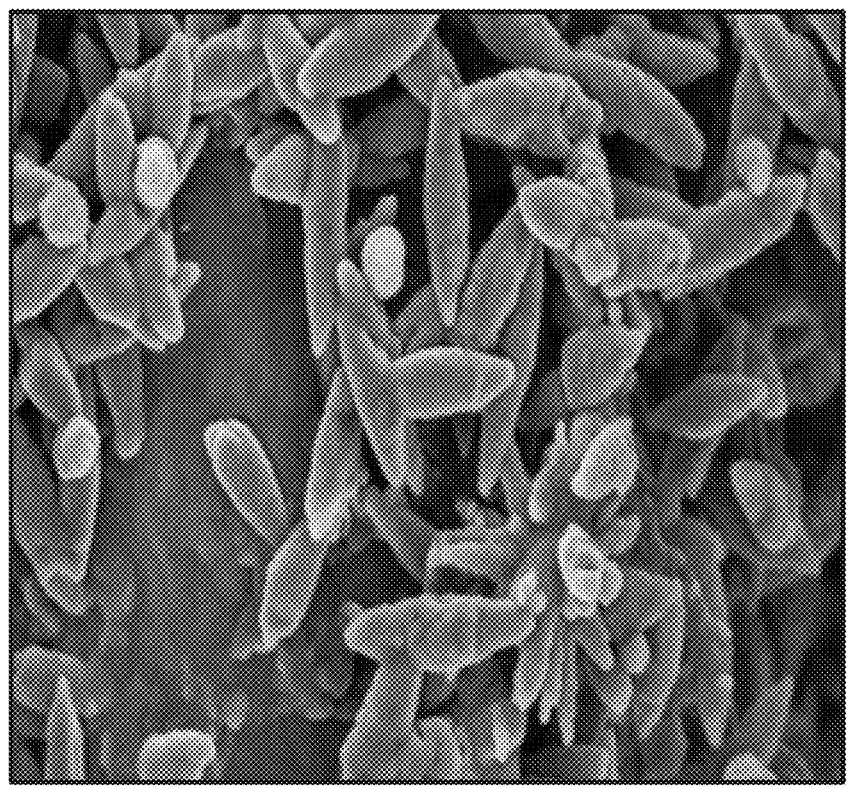
FIG. 2A-2B are scanning electron microscopic image of the surface of the formation rock sample in EXAMPLE 1, showing different types of calcium carbonate polymorph formed by the calcium hydroxide nanocrystals after the surface hardening treatment, in accordance with one of more embodiments.
Figure 2B:
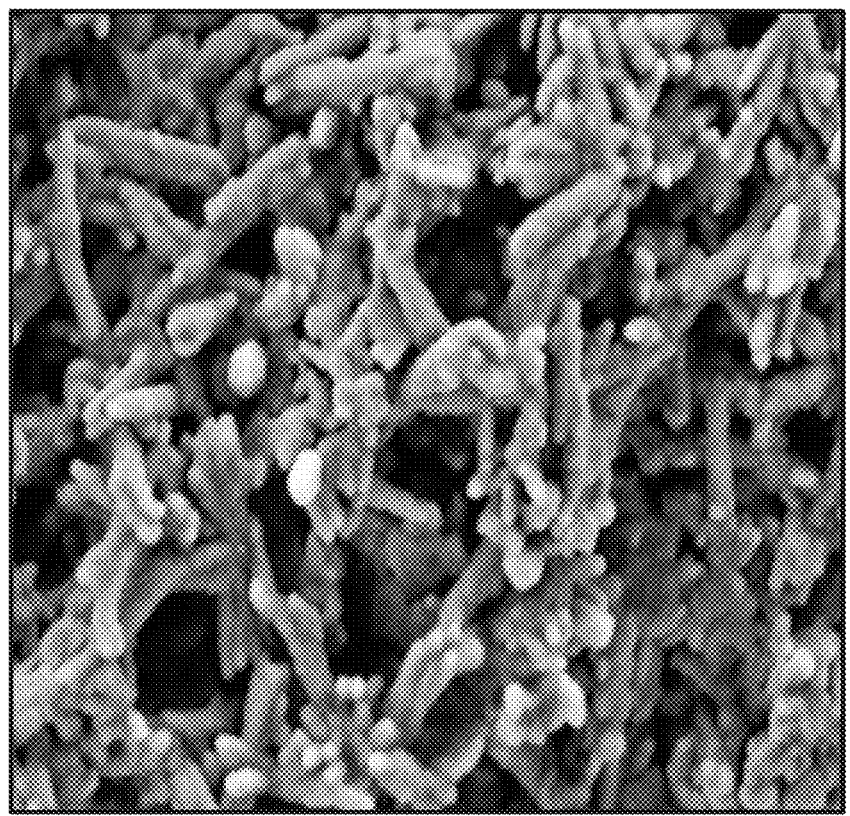

FIGS. 2A and 2B is an SEM image the plug sample of EXAMPLE 1, showing different types of calcium carbonate polymorph formed by the calcium hydroxide nanocrystals after the surface hardening treatment.

Figure 4:
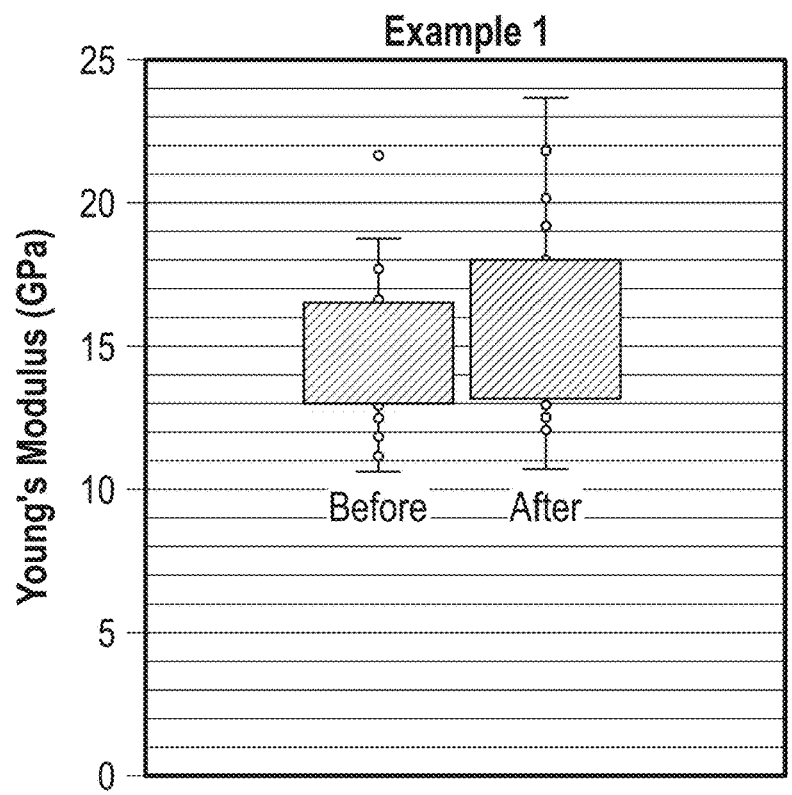
FIG. 4 is a plot of Young's modulus of the formation rock in EXAMPLE 1 before and after the surface hardening treatment in accordance with one of more embodiments.
Figure 5:
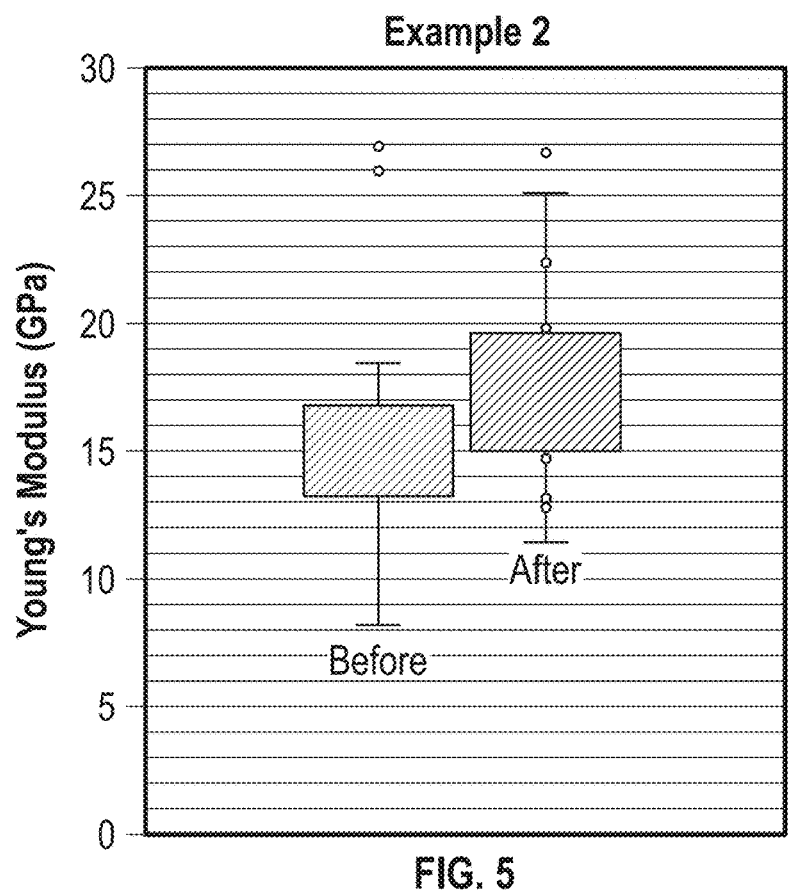
FIG. 5 is a plot of Young's modulus of the formation rock in EXAMPLE 2 before and after the surface hardening treatment in accordance with one of more embodiments.

Table 1, and FIGS. 4 and 5 show the Young's moduli of EXAMPLES 1 and 2 before and after the wellbore stabilizing fluid treatment. The wellbore stabilizing fluid contained calcium hydroxide nanocrystals. The mean Young's modulus of the plug samples of EXAMPLE 1 increased by 9.1% after the treatment, while the mean Young's modulus of the plug samples of EXAMPLE 2 increased by 15.8%, illustrating that the treatment by the wellbore stabilizing fluid containing calcium hydroxide nanocrystals substantially improved the hardness of the sample. FIGS. 1A-B suggest that such increase of Young's modulus may be caused by the precipitation of calcium carbonate polymorph on the surface of the sample.

TABLE 1

|  | EXAMPLE 1 | | EXAMPLE 2 | | EXAMPLE 3 | | EXAMPLE 4 | |
| --- | --- | --- | --- | --- | --- | --- | --- | --- |
|  | Before | After | Before | After | Before | After | Before | After |
| Surface hardening treatment |  |  |  |  |  |  |  |  |
| Mean Young's modulus (MPa) | 14.7 | 16.04 | 15.49 | 17.93 | 14.26 | 16.8 | 14.18 | 17.84 |
| Young's modulus Standard Deviation (MPa) | 0.5 | 0.66 | 0.8 | 0.75 | 0.74 | 0.87 | 0.8 | 0.8 |
| Young's modulus Range (MPa) | 10.99 | 12.94 | 18.62 | 15.26 | 13.49 | 20.29 | 13.62 | 16.68 |
| Minimum Young's modulus (MPa) | 10.6 | 10.7 | 8.28 | 11.42 | 8.41 | 5.19 | 7.64 | 9.57 |
| Maximum Young's modulus (MPa) | 21.58 | 23.63 | 26.9 | 26.29 | 21.9 | 25.48 | 21.26 | 26.25 |
| Mean Young's modulus increase (%) | 9.1 | | 15.8 | | 17.8 | | 25.8 | |

Figure 6:
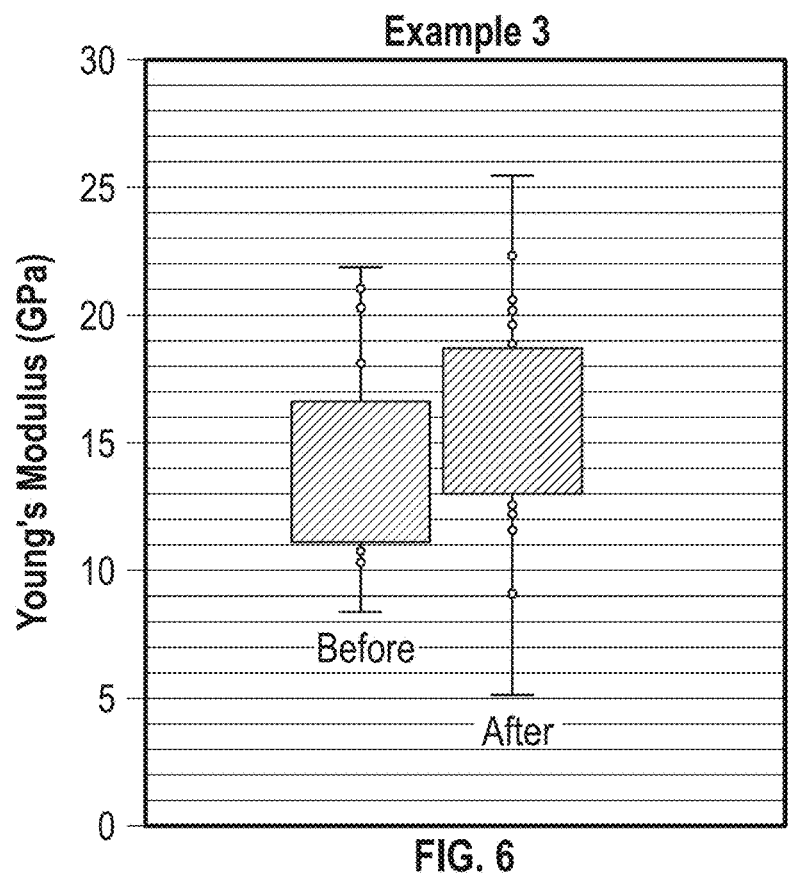
FIG. 6 is a plot of Young's modulus of the formation rock in EXAMPLE 3 before and after the surface hardening treatment in accordance with one of more embodiments.

Table 1 and FIG. 6 show the Young's modulus of EXAMPLE 3 before and after the wellbore stabilizing fluid treatment. The wellbore stabilizing fluid contained TEOS. The mean Young's modulus of the plug samples of EXAMPLE 3 after the wellbore stabilizing fluid treatment was higher by 17.8% compared to before the treatment, demonstrating the effectiveness of TEOS as a hardening agent for a wellbore wall.

Figure 7:
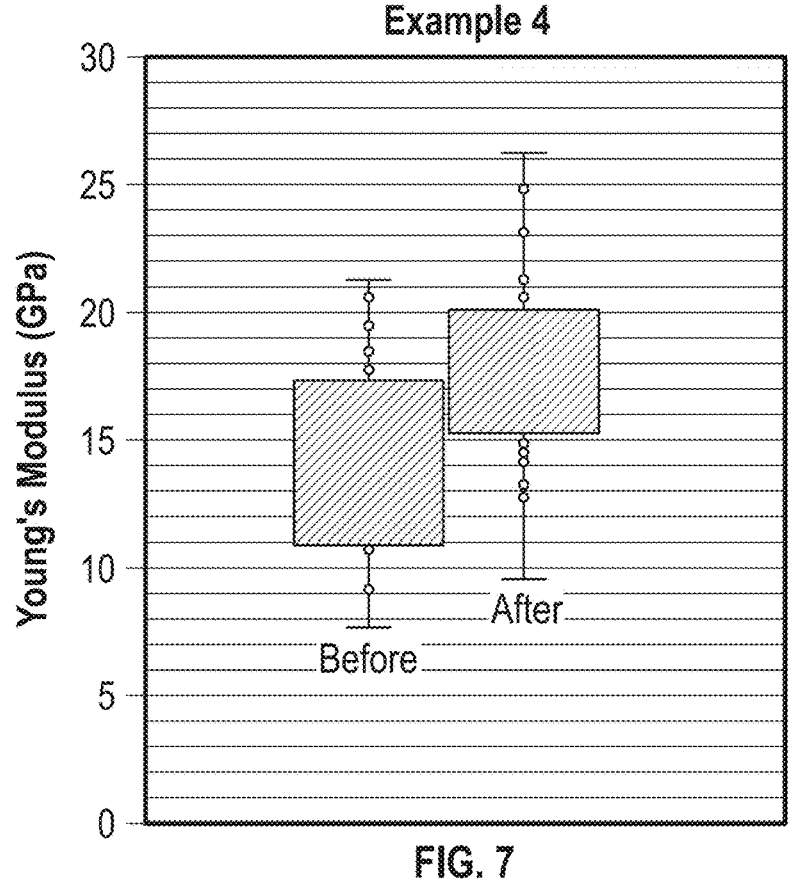
FIG. 7 is a plot of Young's modulus of the formation rock in EXAMPLE 4 before and after the surface hardening treatment in accordance with one of more embodiments.

Table 1 and FIG. 7 show the Young's modulus of EXAMPLE 4 before and after the wellbore stabilizing fluid treatment. The wellbore stabilizing fluid contained zinc sulfate. The wellbore stabilizing fluid treatment resulted the mean Young's modulus of the plug samples of EXAMPLE 4 to be increased by 25.8%, compared to the untreated samples, demonstrating the effectiveness of zinc sulfate as a hardening agent for a wellbore wall.

Figure 3A:
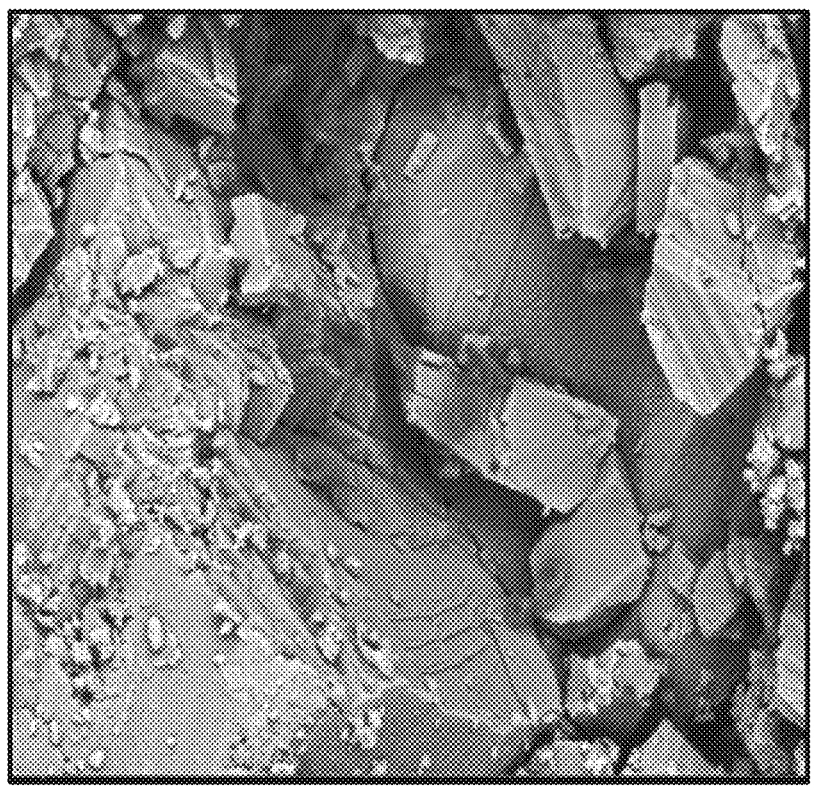
FIG. 3A is a scanning electron microscopic image of the surface of the formation rock sample in EXAMPLE 4 before the surface hardening treatment in accordance with one of more embodiments.
Figure 3B:
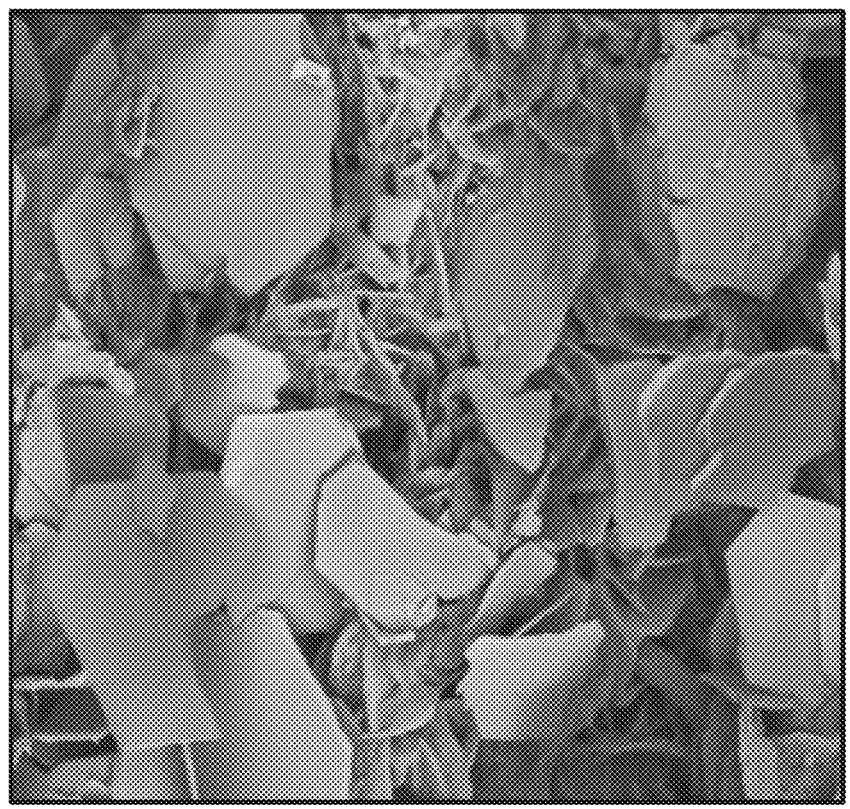
FIG. 3B is a scanning electron microscopic image of the surface of the formation rock sample in EXAMPLE 4 subjected to the surface hardening treatment in accordance with one of more embodiments.

FIGS. 3A and 3B are SEM images of the plug sample of EXAMPLE 4 before and after the treatment with the wellbore stabilizing fluid containing zinc sulfate, respectively. FIG. 3B shows a substantially different surface morphology compared to FIG. 3A, suggesting that zinc sulfate may have reacted with the calcite ($CaCO_3$) of the rock surface in the presence of water molecule to produce zinc carbonate or smithsonite ($ZnCO_3$), converting the calcite on the surface to smithsonite. Smithsonite is a harder mineral than calcite, and such precipitation of zinc carbonate on the sample surface may have resulted in the increase of Young's modulus. XRF evaluation of EXAMPLE 4 also showed an increase of zinc and a decrease of calcium on the surface of the sample after the treatment, indicating that the precipitation of zinc carbonate on the surface occurred as a result of the treatment.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A method for stabilizing a wellbore, the method comprising a treatment cycle of:
   introducing a hardening agent comprising zinc sulfate into the wellbore;
   mixing the hardening agent with a carrier fluid in the wellbore to produce a wellbore stabilizing fluid; and
   treating a wellbore wall of the wellbore by contacting the wellbore stabilizing fluid with a surface of the wellbore wall comprising a formation rock comprising calcium carbonate, and reacting the calcium carbonate comprised in the wellbore wall with the zinc sulfate comprised in the hardening agent to form zinc carbonate on the surface of the wellbore wall, and maintaining the contacting for a duration in a range of from 48 hours to 72 hours.

2. The method of claim 1, wherein the hardening agent comprises 10 g/L to 50 g/L of zinc sulfate.

3. The method of claim 1, wherein the wellbore stabilizing fluid further comprises a solvent comprising at least one of ethanol and isopropanol.

4. The method of claim 1, wherein the method further comprises repeating the treatment cycle of the introducing the hardening agent, the mixing, and the treating.

5. The method of claim 1, wherein the method is conducted at an elevated temperature ranging from 40° C. to 100° C.

6. The method of claim 1, wherein a Young's modulus of the wellbore wall after the treating is higher than a Young's modulus of the wellbore wall before the treating by 5% to 25.8%.

7. The method of claim 1, wherein the wellbore stabilizing fluid further comprises a thickener.

8. A stabilized wellbore, comprising:
   a wellbore having a wellbore wall, the wellbore wall:

comprising zinc carbonate on a surface, comprising a formation rock comprising calcium carbonate, and treated with a wellbore stabilizing fluid comprising a hardening agent comprising zinc sulfate, wherein:

zinc carbonate is formed by reacting the calcium carbonate comprised in the wellbore wall with the zinc sulfate comprised in the hardening agent, and a Young's modulus of the wellbore wall treated with the wellbore stabilizing fluid is higher than a Young's modulus of a wellbore wall of a wellbore not treated by the wellbore stabilizing fluid by 5% to 25.8%.

9. The stabilized wellbore of claim 8, wherein the hardening agent comprises 10 g/L to 50 g/L of zinc sulfate.

10. The stabilized wellbore of claim 8, wherein the wellbore stabilizing fluid further comprises a thickener.

* * * * *